(12) United States Patent
Chen et al.

(10) Patent No.: US 10,712,645 B2
(45) Date of Patent: Jul. 14, 2020

(54) PROJECTION APPARATUS AND ILLUMINATION SYSTEM

(71) Applicant: Coretronic Corporation, Hsin-Chu (TW)

(72) Inventors: Chang-Hsuan Chen, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/286,618

(22) Filed: Feb. 27, 2019

(65) Prior Publication Data

US 2019/0331995 A1    Oct. 31, 2019

(30) Foreign Application Priority Data

Apr. 28, 2018    (CN) .......................... 2018 1 0401237
Nov. 15, 2018   (CN) ..................... 2018 2 1878702 U

(51) Int. Cl.
*G03B 21/20*    (2006.01)
*G02B 5/02*    (2006.01)
(Continued)

(52) U.S. Cl.
CPC ....... *G03B 21/2006* (2013.01); *G02B 5/0205* (2013.01); *G02B 27/0955* (2013.01);
(Continued)

(58) Field of Classification Search
CPC .... G03B 21/006; G03B 21/28; G03B 21/208; G03B 21/2006; G03B 21/2013;
(Continued)

(56) References Cited

U.S. PATENT DOCUMENTS

2009/0185141 A1    7/2009    Chen et al.
2015/0077714 A1    3/2015    Hsieh et al.
(Continued)

FOREIGN PATENT DOCUMENTS

CN    102722027    10/2014
CN    103901707    2/2016
(Continued)

OTHER PUBLICATIONS

"Search Report of Europe Counterpart Application", dated May 14, 2019, p. 1-p. 6.

*Primary Examiner* — Sultan Chowdhury
(74) *Attorney, Agent, or Firm* — JCIPRNET

(57) ABSTRACT

A projection apparatus and an illumination system are provided. The illumination system includes a light source emitting a light beam, at least one light-diffusion element disposed on a transmission path of the light beam from the light source and inclined to the transmission path of the light beam from the light source, a wavelength conversion module disposed on a transmission path of the light beam from the at least one light-diffusion element. A long axis direction of a light spot projected on the wavelength conversion module is perpendicular to an extending direction of a boundary between the reference plane and the at least one light-diffusion element. The wavelength conversion module is adapted to convert a first portion of the light beam from the light-diffusion element to a converted light beam. The converted light beam and a second portion of the light beam from the light-diffusion element form a illumination light.

14 Claims, 12 Drawing Sheets

(51) Int. Cl.
*G02B 27/09* (2006.01)
*G02B 27/10* (2006.01)
*G02B 27/30* (2006.01)
*G03B 21/14* (2006.01)

(52) U.S. Cl.
CPC ......... *G02B 27/1006* (2013.01); *G02B 27/30* (2013.01); *G03B 21/142* (2013.01); *G03B 21/204* (2013.01)

(58) Field of Classification Search
CPC  G03B 21/2033; G03B 21/2053; G02B 27/30; G02B 27/225; G02B 27/0955; G02B 27/1006; G02B 5/02; G02B 5/18; G02B 5/0242; G02B 5/0263; G02B 5/0278
See application file for complete search history.

(56) References Cited

U.S. PATENT DOCUMENTS

| | | | |
|---|---|---|---|
| 2016/0327851 A1 | 11/2016 | Liao et al. | |
| 2017/0123300 A1 | 5/2017 | Shishido | |
| 2018/0038574 A1* | 2/2018 | Hikmet et al. | G02B 27/0994 |
| 2018/0149957 A1* | 5/2018 | Maeda | G02B 26/008 |
| 2018/0335685 A1* | 11/2018 | Okuno | G03B 21/204 |

FOREIGN PATENT DOCUMENTS

| | | |
|---|---|---|
| EP | 2811342 | 12/2014 |
| TW | I509344 | 11/2015 |

\* cited by examiner

PROJECTION APPARATUS AND ILLUMINATION SYSTEM

CROSS-REFERENCE TO RELATED APPLICATION

This application claims the priority benefit of China application serial no. 201810401237.9, filed on Apr. 28, 2018 and China application serial no. 201821878702.X, filed on Nov. 15, 2018. The entirety of the above-mentioned patent application is hereby incorporated by reference herein and made a part of this specification.

BACKGROUND OF THE INVENTION

Field of the Disclosure

The disclosure relates to an optical apparatus and an illumination system, more specifically relates to a projection apparatus and an illumination system.

Description of Related Art

The projection apparatus generally uses the light-emitting element together with the wavelength conversion module (such as a phosphor layer) to generate a light beam for illumination. However, the phosphor layer absorbs external energy. Under the illumination of a high energy light beam (such as a laser beam), the temperature of the phosphor layer increases, which causes reduction in light conversion efficiency, and the phosphor layer is even burnt.

The information disclosed in this "BACKGROUND OF THE INVENTION" section is only for enhancement of understanding of the background of the described technology, and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention was acknowledged by a person of ordinary skill in the art.

SUMMARY OF THE INVENTION

The disclosure provides an illumination system, which assists in solving the problems that the wavelength conversion module is burned due to excessive concentration of beam energy illuminated on the wavelength conversion module, and that the light conversion efficiency is reduced.

The disclosure provides a projection apparatus having good performance.

Other objects and advantages of the invention can be further illustrated by the technical features broadly embodied and described as follows.

In order to achieve one or a portion of or all of the objects or other objects, an embodiment of the invention provides an illumination system which includes a light source, at least one light-diffusion element, and a wavelength conversion module. The light source is adapted to emit a light beam. The at least one light-diffusion element is disposed on a transmission path of the light beam from the light source. The at least one light-diffusion element and a reference plane perpendicular to the transmission path of the light beam from the light source have an inclined angle therebetween. The wavelength conversion module is disposed on a transmission path of the light beam from the inclined at least one light-diffusion element. A long axis direction of a light spot projected on the wavelength conversion module is perpendicular to an extending direction of a boundary between the reference plane and the at least one light-diffusion element. The wavelength conversion module is adapted to convert a first portion of the light beam from the light-diffusion element to a converted light beam. The converted light beam and a second portion of the light beam from the at least one light-diffusion element form an illumination light beam.

In order to achieve one or a portion of or all of the objects or other objects, an embodiment of the invention provides a projection apparatus which includes the illumination system, at least one light valve, and a projection lens. The at least one light valve is disposed on a transmission path of the illumination light beam and adapted to covert the illumination light beam to an image light beam. The projection lens is disposed on a transmission path of the image beam.

Based on the above, the embodiments of the disclosure have at least one of the advantages or effects below. Since the at least one light-diffusion element is inclined to the transmission path of the light beam from the light source, the light spot projected on the wavelength conversion module is expanded along a single axial direction, and thus achieving the effect of reducing the energy density of the light beam. Therefore, the illumination system of the embodiments of the disclosure can effectively solve the problems that the wavelength conversion module is burned due to excessive concentration of beam energy illuminated on the wavelength conversion module, and that the light conversion efficiency is reduced. Moreover, the projection apparatus using the illumination system of the embodiments of the disclosure can have a good performance.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited Moreover, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
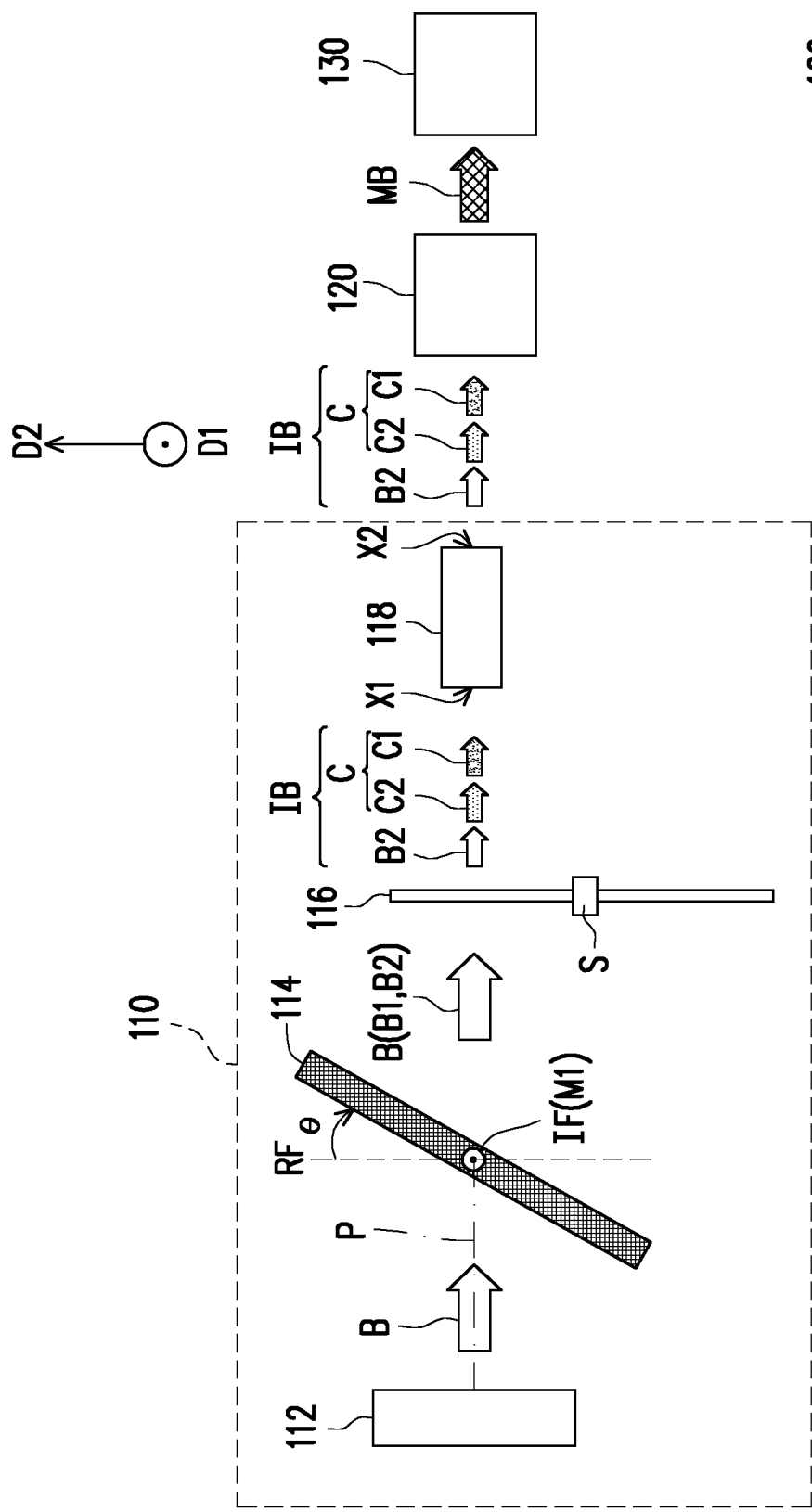
FIG. 1 is a schematic side view of a projection apparatus according to the first embodiment of the disclosure.
Figure 2:
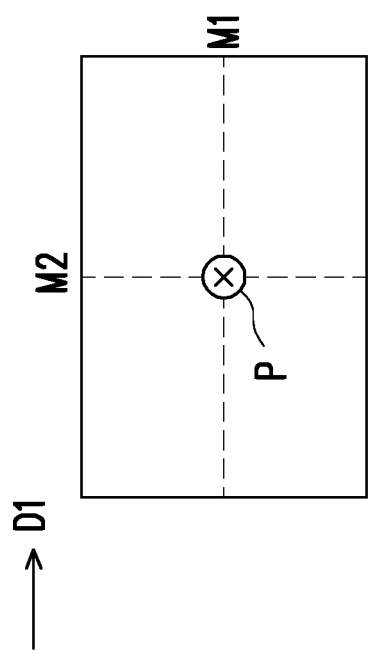
FIG. 2 is a front view of a light-diffusion element in FIG. 1.
Figure 3B:
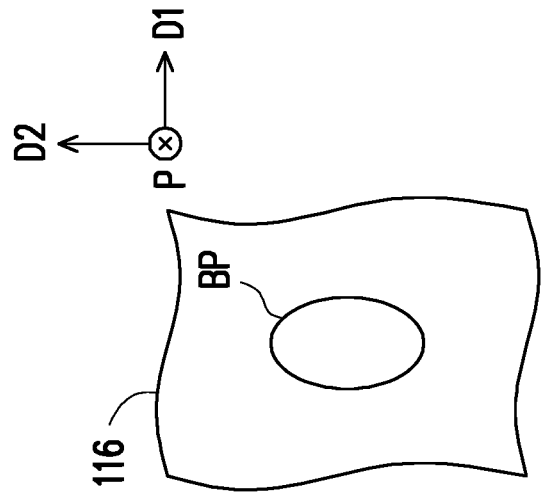
FIG. 3A and FIG. 3B are partial front views of a wavelength conversion module in FIG. 1, respectively, for comparing the difference of a light spot projected on the wavelength conversion module when the light-diffusion element is not inclined and the light-diffusion element is inclined.
Figure 3A:
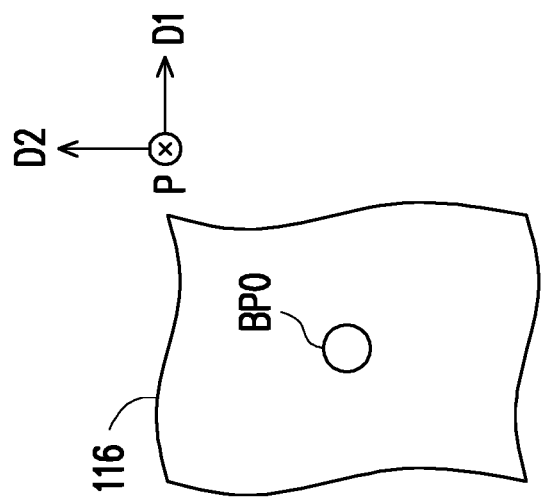

FIG. 1 is a schematic side view of a projection apparatus according to the first embodiment of the disclosure. FIG. 2 is a front view of a light-diffusion element in FIG. 1. FIG. 3A and FIG. 3B are partial front views of a wavelength conversion module in FIG. 1, respectively, for comparing the difference of a light spot projected on the wavelength conversion module when the light-diffusion element is not inclined (FIG. 3A) and the light-diffusion element is inclined (FIG. 3B).

Referring to FIG. 1, a projection apparatus 100 of the first embodiment of the disclosure includes an illumination system 110, at least one light valve (such as a light valve 120), and a projection lens 130. In the embodiment, the projection apparatus 100 includes, for example, only one light valve (such as the light valve 120), but the disclosure is not limited thereto.

The illumination system 110 includes a light source 112, at least one light-diffusion element (such as a light-diffusion element 114), and a wavelength conversion module 116. In the embodiment, the illumination system 110 includes only one light-diffusion element (such as the light-diffusion element 114), but the disclosure is not limited thereto.

The light source 112 is adapted to emit a light beam B. The light source 112 may include a plurality of light-emitting elements (not shown). The plurality of light-emitting elements may include a plurality of visible light-emitting elements, a plurality of non-visible light-emitting elements, or combination of the two types of light-emitting elements. The visible light-emitting element may be a light emitting diode or a laser diode, but the disclosure is not limited thereto. The visible light-emitting element may include a blue light emitting element, and the non-visible light emitting element may include an ultraviolet (UV) light-emitting element, but the disclosure is not limited thereto.

The light-diffusion element 114 is disposed on a transmission path P of the light beam B from the light source 112. A reference plane RF is perpendicular to the transmission path P of the light beam B from the light source 112. An inclined angle θ is between the light-diffusion element 114 and the reference plane RF, so that the light-diffusion element 114 is inclined to the transmission path P of the light beam B from the light source 112. Referring to FIGS. 1, 2 and 3B, the light-diffusion element 114 may be inclined to the transmission path P of the light beam B from the light source 112 by a way that a first center line M1 serves as a rotating axis of the light-diffusion element 114, and the light-diffusion element 114 is rotated by an angle (such as the inclined angle θ) with the reference plane RF as an original surface. In this way, the light beam B passing through the inclined light-diffusion element 114 is expanded in a direction D2 perpendicular to an extending direction D1 (such as an extending direction of the first center line MD of the rotating axis of the light-diffusion element 114. Namely, the light beam B passing through the inclined light-diffusion element 114 is expanded in the direction D2, so that the long axis direction (such as the direction D2 and its opposite direction) of the light spot BP projected on the wavelength conversion module 116 is perpendicular to an extending direction (such as the extending direction D1 of the rotating axis and the opposite direction of the extending direction D1) of a boundary IF between the reference plane RF and the light-diffusion element 114 in FIG. 1.

The difference between FIG. 3A and FIG. 3B is that the light-diffusion element is designed to be perpendicular to the transmission path of the light beam from the light source in FIG. 3A, while the light-diffusion element is designed to be inclined to the transmission path of the light beam from the light source in FIG. 3B. By comparing FIG. 3B with FIG. 3A, it is known that the light spot BP projected on the wavelength conversion module 116 is effectively expanded along a single axial direction (such as the direction D2 and its opposite direction) in FIG. 3B, while the light spot BP0 does not have a shape that expands along a single axial direction. Since the energy density of the light spot BP is negatively correlated with the area of the light spot BP projected on the wavelength conversion module 116, by setting the light-diffusion element 114 to be inclined with respect to the transmission path P of the light beam B from the light source 112, the reduction of the energy density can be effectively achieved, and the problems that the wavelength conversion module is burned and the light conversion efficiency is reduced due to excessive concentration of beam energy illuminated on the wavelength conversion module are solved.

In the embodiment, the greater the inclined angle θ is, the more obvious the light beam is expanded, and the more obvious the energy density is effectively reduced. However, when the inclined angle θ is excessively large, the efficiency of the light beam passing through the light-diffusion element may be reduced. In the embodiment, when the inclined angle θ is greater than or equal to 15 degrees and smaller than or equal to 60 degrees, the efficiency of the light beam passing through the light-diffusion element can be maintained while reducing the energy density.

In FIG. 1 and FIG. 3B, the light-diffusion element 114 is rotated by an angle (such as the inclined angle θ) with the first center line M1 as a rotating axis, so that the light-diffusion element 114 is inclined to the transmission path P of the light beam B from the light source 112, and thus the light spot BP is expanded in the direction D2 which is perpendicular to the extending direction D1 of the rotating axis, but the disclosure is not limited thereto. To be more specific, as shown in FIG. 2, the light-diffusion element 114 further includes a second center line M2, wherein the first center line M1 and the second center line M2 are perpendicular to each other, and the first center line M1 and the second center line M2 are respectively perpendicular to the transmission path P of the light beam B from the light source 112. In another embodiment, the light-diffusion element 114 may be rotated by an angle with the second center line M2 as a rotating axis and the reference plane RF in FIG. 1 as an initial surface. With this design, the light beam passing through the inclined light-diffusion element 114 is expanded in the direction perpendicular to the extending direction of the second center line. In other words, when the light-diffusion element 114 is rotated by an angle with the second center line M2 as the rotating axis, the light-diffusion element 114 is inclined to the transmission path P of the light beam B from the light source 112, and the light spot projected on the wavelength conversion module 116 is presented by rotating the light spot BP in FIG. 3B by an angle of 90 degrees.

The light-diffusion element 114 may include a diffuser (such as a diffusion sheet) or a lens array, but the disclosure is not limited thereto. The lens array is formed by arranging a plurality of lens element units as an array. Each lens element unit may be a plano-convex lens element, a plano-concave lens element, a biconcave lens element, a biconvex lens element, a concave-convex lens element, or a convex-concave lens element. In FIG. 2, the shape of the light-diffusion element 114 is rectangular, wherein the first center line M1 is formed by connecting the two midpoints of the pair of short sides of the rectangle, and the second center line M2 is formed by connecting the two midpoints of the pair of long sides of the rectangle. However, the shape of the light-diffusion element 114 may be changed according to requirements. For example, the shape of the light-diffusion element 114 may be a circle, other kinds of quadrilaterals or other polygons. Moreover, the first center line M1 and the second center line M2 are defined for convenience of subsequent description, and therefore the first center line M1 and the second center line M2 may not be physically indicated on the light-diffusion element 114.

Referring to FIG. 1, the wavelength conversion module 116 is disposed on the transmission path of the light beam B from the inclined light-diffusion element 114. The wavelength conversion module 116 is adapted to convert a first portion B1 of the light beam B from the light-diffusion element 114 to a converted light beam C. The converted light beam C and a second portion B2 of the light beam B from the light-diffusion element 114 form an illumination light beam IB. To be more specific, the wavelength conversion module 116 may include a wavelength conversion layer (not shown), a substrate (not shown) carrying the wavelength conversion layer, a central rotating axis S passing through the center of the substrate, but the disclosure is not limited thereto. The material of the wavelength conversion layer may include phosphor, quantum dot, or the combination of the two kinds of materials, but the disclosure is not limited thereto. The substrate may be a transparent substrate or a reflective substrate (such as a metal substrate, but the disclosure is not limited thereto).

Figure 14:
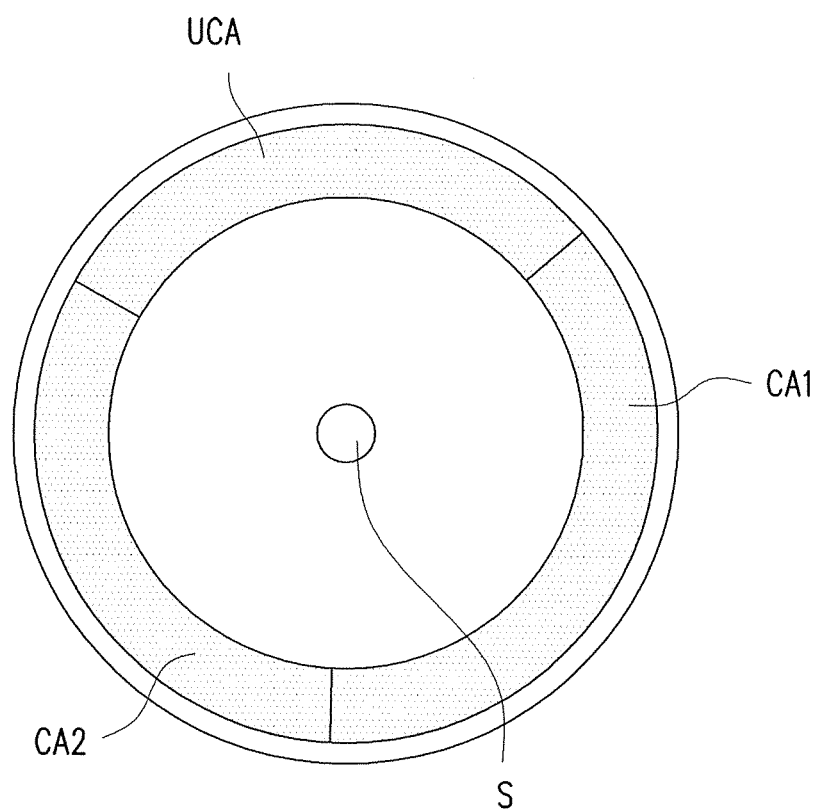
FIG. 14 is a front view of a wavelength conversion module in FIG. 1.

Referring to FIG. 14, the wavelength conversion module 116 is a transparent wavelength conversion module. Specifically, in the embodiment, the substrate is a transparent substrate, and the transparent substrate has a penetration area UCA and at least one light conversion area. The penetration area UCA and the at least one light conversion area are disposed around the central rotating axis S. The wavelength conversion layer is located at the at least one light conversion area and exposes the penetration area UCA. The wavelength conversion module 116 is adapted to rotate about the central rotating axis S, so that the at least one light conversion area and the penetration area UCA alternately cut into the transmission path of the light beam B from the light-diffusion element 114. When the at least one light conversion area cuts into the transmission path of the light beam B from the light-diffusion element 114, the first portion B1 of the light beam B is converted to the converted light beam C by the wavelength conversion layer, and the converted light beam C passes through the transparent substrate and propagates to the light valve 120. When the penetration area UCA cuts into the transmission path of the light beam B from the light-diffusion element 114, the second portion B2 of the light beam B passes through the transparent substrate and propagates to the light valve 120. As a person of this skill of art knew, a substrate plate of wavelength conversion module 116 is driven by a motor (not shown) and rotates around a central rotation axis S. According to the rotation of the substrate, the light conversion area and the light un-conversion area (for example, abovementioned penetration area UCA) cut into the transmission path of the light beam B from the light-diffusion element 114 in order. The first portion B1 of the light beam B represents a light beam illuminating onto the light conversion area (wavelength conversion layer). The second portion B2 of the light beam B represents a light beam illuminating onto the light un-conversion area (penetration area UCA). More specifically, in the embodiment, when the light conversion area rotates into the transmission path of the light beam B, the light beam B illuminating on the light conversion area (wavelength conversion layer), as well as which is the first portion B1 of the light beam B, is converted into the converted light beam C by the light conversion area (wavelength conversion layer). On the other hand, in the embodiment, when the light un-conversion area (for example, abovementioned penetration area UCA) rotates into the transmission path of the light beam B, the light beam B illuminating on the light un-conversion area (penetration area UCA), which is the second portion B2 of the light beam B, passes through the transparent substrate and propagates to the light valve 120. In the specification of the invention and claims, the titled first portion B1 and second portion B2 do not mean a beam comprising two kinds or two light beams. It means that the same light beam from the light source 112 illuminates the wavelength conversion module 116 in different periods. For example, the same light beam respectively illuminates onto the light conversion area (wavelength conversion layer) and the light un-conversion area (penetration area UCA). For the sake of convenience, the light beam illuminates onto the light conversion area (wavelength conversion layer) and the light un-conversion area (penetration area UCA) of the wavelength conversion module 116 in different periods to be represented a first portion of light beam and a second portion of light beam. The first portion B1 of the light beam B represents a light beam illuminating the light conversion area (wavelength conversion layer). Because when the light conversion area rotates into the transmission path of the light beam B, the light beam B1 is converted into the converted light beam C by the light conversion area (wavelength conversion layer), and the second portion B2 of the light beam B represents a light beam illuminating the light un-conversion area (penetration area UCA). In the other embodiments, if the substrate is a reflected substrate (metal substrate), the light un-conversion area may be a penetration area UCA or a un-penetration area. If the light un-conversion area is the un-penetration area, the light un-conversion area is a part of the surface of the metal substrate. The second portion B2 of the light beam B represents a beam illuminating onto the light un-conversion area of the surface of the metal substrate.

Referring to FIG. 14, the transparent substrate has two light conversion areas, such as a red light conversion area CA1 and a green light conversion area CA2. In the embodiment, the wavelength conversion layer includes red light wavelength conversion material and green light wavelength conversion material. The red light wavelength conversion material locates in the red light conversion area CA1, and the green light wavelength conversion material locates in the green light conversion area CA2. In the embodiment, the red light conversion area CA1, the green light conversion area CA2, and the penetration area UCA alternately cut into the transmission path of the light beam B from the light-diffusion element 114, for example. Therefore, the red light C1, the green light C2, and the blue light (the second portion B2 of the light beam B) are sequentially output from the wavelength conversion module 116 and propagate to the light valve 120.

In another embodiment, the wavelength conversion module 116 may have only one light conversion area (such as a yellow light conversion area), and the wavelength conversion module 116 can be integrated with a filter element (not shown) so as to output the red light, green light, and blue light, but the disclosure is not limited thereto. In yet another embodiment, the filter element may be disposed between the wavelength conversion module 116 and the light valve 120. Moreover, at least one lens element can be further disposed between the wavelength conversion module 116 and the filter element and/or between the light-diffusion element 114 and the wavelength conversion module 116.

In the embodiment, the illumination system 110 further includes a light-homogenizing element 118. The light-homogenizing element 118 is disposed on the transmission path of the illumination light beam IB from the wavelength conversion module 116, so as to provide effects of shaping and homogenizing the illumination light beam IB. For example, the light-homogenizing element 118 is an integral rod, but the disclosure is not limited thereto.

In the embodiment, a light-output end X2 of the light-homogenizing element 118 has a shape corresponding to the screen shape of the light valve 120, so that the shape of the light spot output from the light-output end X2 of the light-homogenizing element 118 matches the screen shape of the light valve 120. Generally, the screen shape of the light valve 120 is rectangular, so the shape of the light-output end X2 of the light-homogenizing element 118 is also rectangular. In the embodiment, the long side of the light-output end X2 of the light-homogenizing element 118 is corresponding to the long side of the screen of the light valve 120. Moreover, in the embodiment, a light-input end X1 of the light-homogenizing element 118 has a shape related to the shape of the light spot BP on the wavelength conversion module 116. In the embodiment, the shape of the light-input end X1 of the light-homogenizing element 118 is, for example, a rectangle having a pair of long sides and a pair of short sides, and the long sides of the light-input end X1 are corresponding to the long axis direction of the light spot BP in FIG. 3B, for example. In the embodiment, the long sides of the light-output end X2 of the light-homogenizing element 118 are corresponding/parallel to not only the long sides of the screen of the light valve 120 and the long sides of the light-input end X1, but also the long axis direction of the light spot BP in FIG. 3B, but the disclosure is not be limited thereto. As a result, a better light receiving efficiency and a better light utilization rate can be achieved.

The light valve 120 is disposed on the transmission path of the illumination light beam IB from the light-homogenizing element 118 and adapted to covert the illumination light beam IB to an image light beam MB. The light valve 120 may include a digital micro-mirror device (DMD), a liquid crystal on silicon (LCOS), or a liquid crystal display panel (LCD panel), but the disclosure is not limited thereto.

The projection lens 130 is disposed on the transmission path of the image beam MB and is adapted to project the image beam MB, which is from the light valve 120, to an image plane (not shown). The projection lens 130 may adopt any type of projection lens, which is not limited herein.

Figure 4:
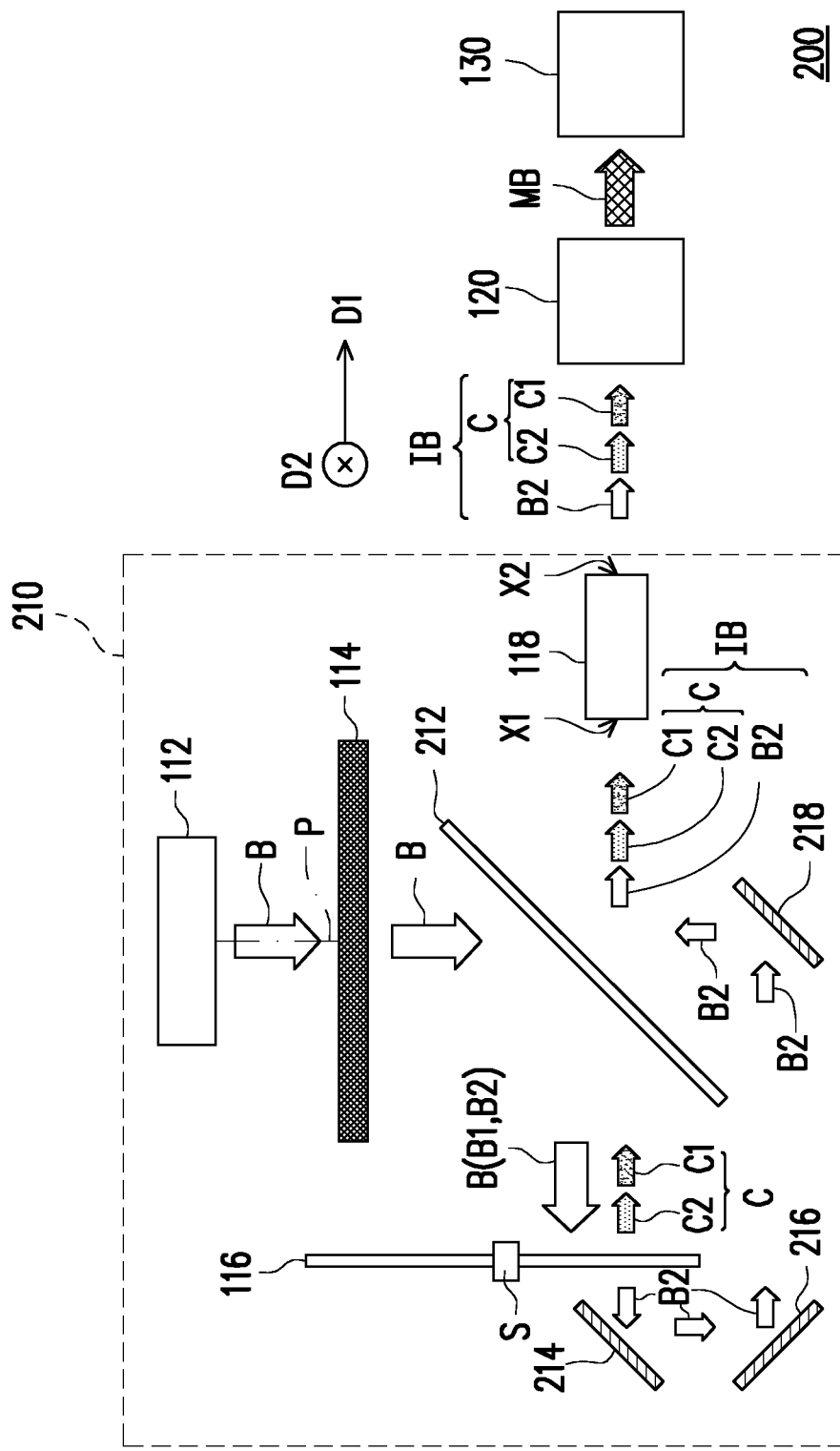
FIG. 4 is a schematic top view of a projection apparatus according to the second embodiment of the disclosure.

FIG. 4 is a schematic top view of a projection apparatus according to the second embodiment of the disclosure. Referring to FIG. 4, a projection apparatus 200 of the second embodiment of the disclosure is similar to the projection apparatus 100 of FIG. 1. The main differences between the two embodiments are described as follows. In the projection apparatus 200, the illumination system 210 further includes a light combiner 212 and a plurality of reflecting elements (such as a reflecting element 214, a reflecting element 216, and a reflecting element 218). The light combiner 212 is disposed on the transmission path of the light beam B from the light-diffusion element 114. In the embodiment, the light combiner 212 reflects the light beam B, which is from the light-diffusion element 114, and allows the converted light beam C to pass through. The wavelength conversion module 116 is disposed on the transmission path of the light beam B from the light combiner 212. In the embodiment, the wavelength conversion module 116 is adapted to transmit (reflect) the converted light beam C to the light combiner 212 and allow the second portion B2 to pass through. In the embodiment, the plurality of reflecting elements (such as the reflecting element 214, the reflecting element 216, and the reflecting element 218) are disposed on the transmission path of the second portion B2 from the wavelength conversion module 116, and are adapted to transmit (reflect) the second portion B2 to the light combiner 212.

Figure 5:
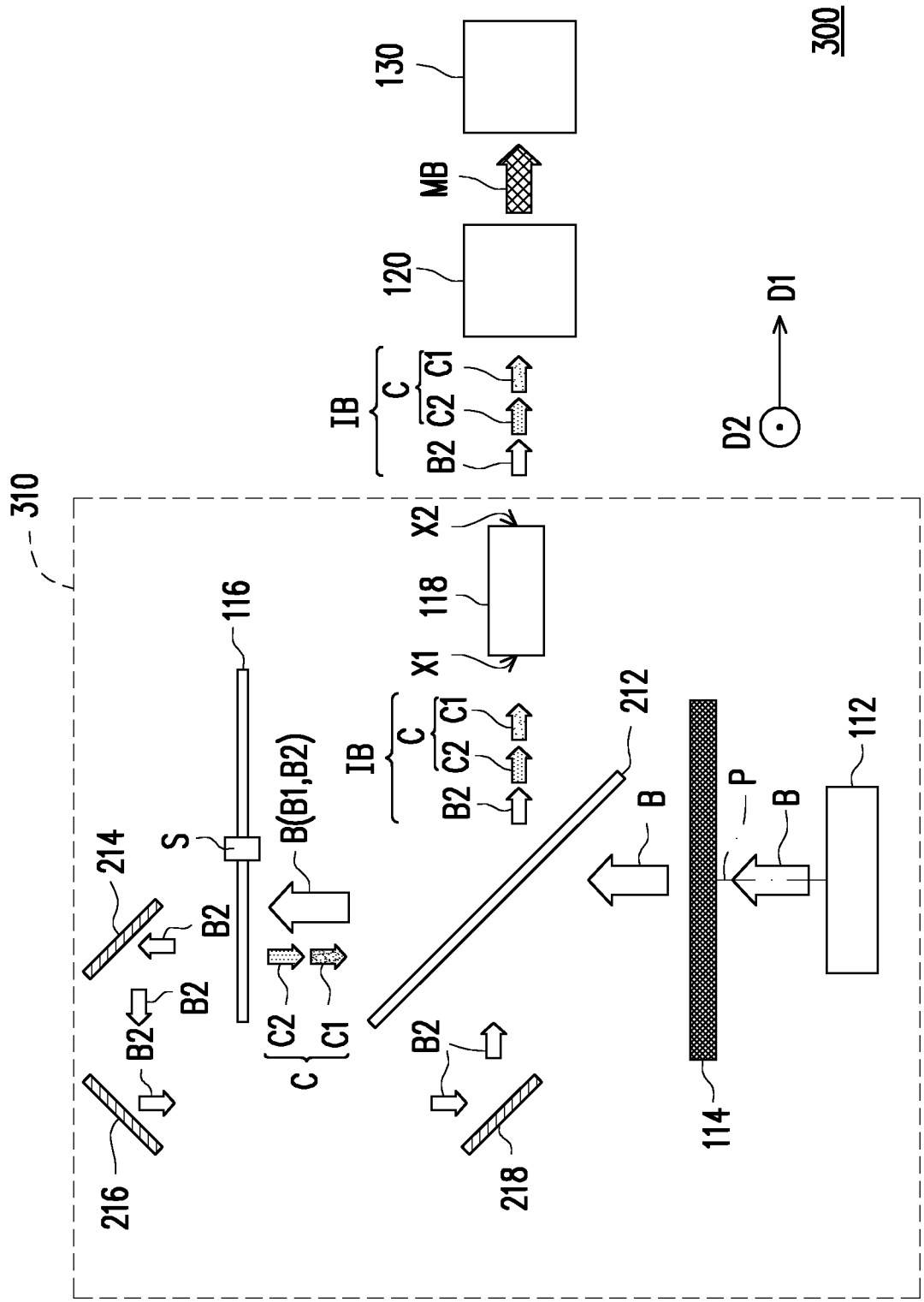
FIG. 5 is a schematic top view of a projection apparatus according to the third embodiment of the disclosure.

FIG. 5 is a schematic top view of a projection apparatus according to the third embodiment of the disclosure. Referring to FIG. 5, a projection apparatus 300 of the third embodiment of the disclosure is similar to the projection apparatus 200 of FIG. 4. The main differences between the two embodiments are described as follows. In an illumination system 310 of the projection apparatus 300, the light combiner 212 allows the light beam B from the light-diffusion element 114 to pass through and reflects the converted light beam C.

Figure 6:
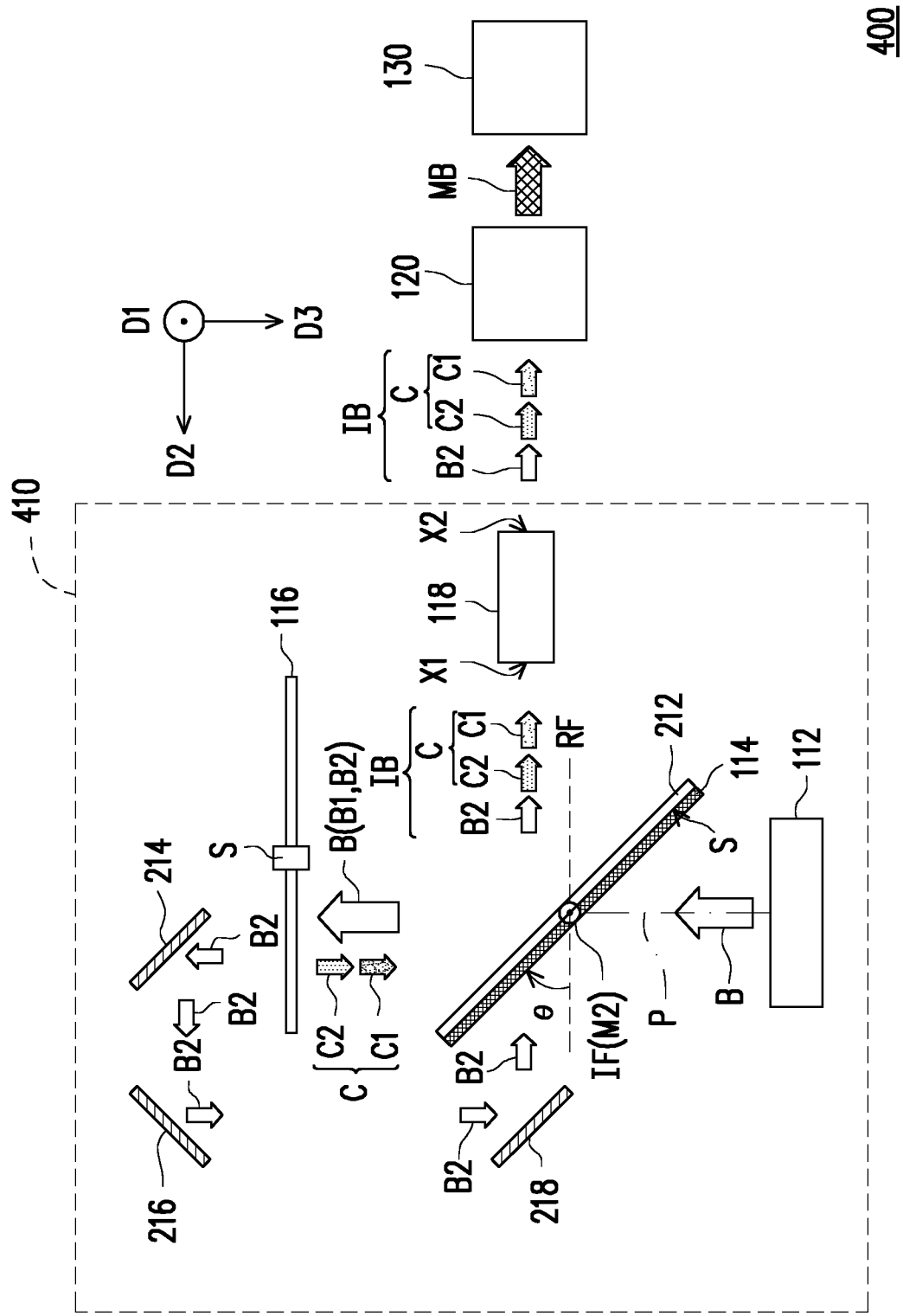
FIG. 6 is a schematic top view of a projection apparatus according to the fourth embodiment of the disclosure.
Figure 7:
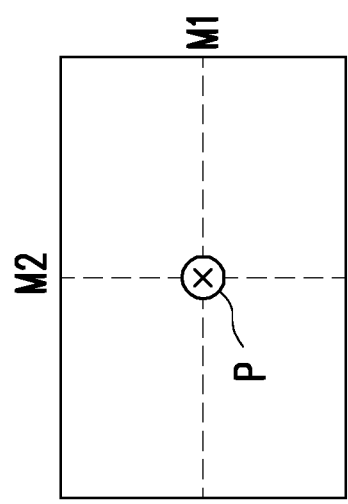
FIG. 7 is a front view of a light-diffusion element in FIG. 6.
Figure 8B:
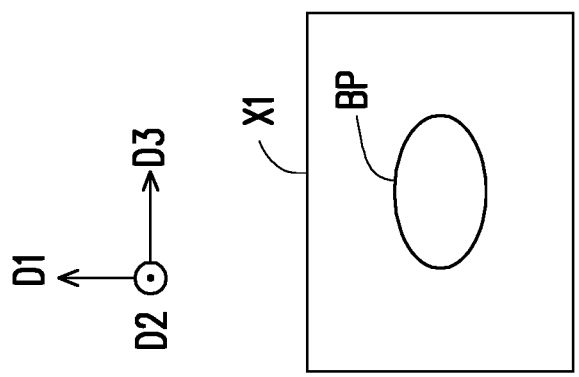
FIG. 8B is a front view of a light-output end of a light-homogenizing element in FIG. 6 for illustrating a light spot projected on the light-output end of the light-homogenizing element when the light-diffusion element is inclined.
Figure 8A:
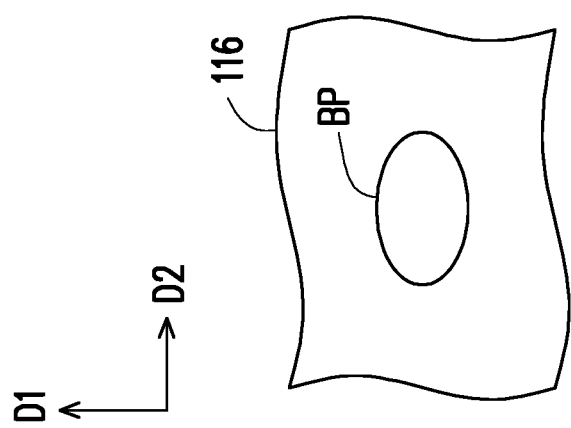
FIG. 8A is a partial front view of a wavelength conversion module in FIG. 6 for illustrating a light spot projected on the wavelength conversion module when the light-diffusion element is inclined.

FIG. 6 is a schematic top view of a projection apparatus according to the fourth embodiment of the disclosure. FIG. 7 is a front view of a light-diffusion element 114 in FIG. 6. FIG. 8A is a partial front view of a wavelength conversion module in FIG. 6 for illustrating a light spot projected on the wavelength conversion module when the light-diffusion element 114 is inclined. FIG. 8B is a front view of a light-output end of a light-homogenizing element 118 in FIG. 6 for illustrating a light spot projected on the light-output end of the light-homogenizing element 118 when the light-diffusion element 114 is inclined.

Referring to FIG. 6, a projection apparatus 400 of the fourth embodiment of the disclosure is similar to the projection apparatus 300 of FIG. 5. The main differences between the two embodiments are described as follows. In an illumination system 410 of the projection apparatus 400, the light-diffusion element 114 is disposed on a surface S of the light combiner 212 facing the light source 112. To be more specific, the light combiner 212 is usually inclined to the transmission path P of the light beam B from the light source 112. For example, the light combiner 212 is usually disposed to form an angle of 45 degrees with respect to the transmission path P of the light beam B from the light source 112. Therefore, in the embodiment, the light-diffusion element 114 and the light combiner 212 are combined with each other using the inclination/angle feature. With this design, the light-diffusion element 114 and the reference plane RF perpendicular to the transmission path P of the light beam B from the light source 112 have an inclined angle θ therebetween, so that the light-diffusion element 114 is inclined to the transmission path P of the light beam B from the light source 112. The inclined angle θ is 45 degrees, for example, but the disclosure is not limited thereto.

Referring to FIG. 6 to FIG. 8B, in the embodiment, the light-diffusion element 114 may be rotated by an angle (such as the inclined angle θ) with the second center line M2 as a rotating axis and the reference plane RF as an original surface. In this way, the light beam B passing through the inclined light-diffusion element 114 is expanded in the direction D2 perpendicular to the extending direction D1 (such as an extending direction of the second center line M2) of the rotating axis of the light-diffusion element 114. Namely, the light beam B passing through the inclined light-diffusion element 114 is expanded in the direction D2, so that the long axis direction (such as the direction D2 and its opposite direction) of the light spot BP projected on the wavelength conversion module 116 is perpendicular to an extending direction (such as the extending direction D1 of the rotating axis and the opposite direction of the extending direction D1) of a boundary IF between the reference plane RF and the light-diffusion element 114 in FIG. 6. Moreover, in the embodiment, the shape of the light-input end X1 of the light-homogenizing element 118 is, for example, a rectangle having a pair of long sides and a pair of short sides. The extending direction (such as the direction D3 and its opposite direction) of the long sides of the light-input end X1 of the light-homogenizing element 118 is designed to be perpendicular to the long axis direction (such as the direction D2 and its opposite direction) of the light spot BP projected on the wavelength conversion module 116 and the extending direction (such as the extending direction D1 of the rotating axis and the opposite direction of the extending direction D1) of the boundary IF. Therefore, when the light spot BP enters the light-input end X1 of the light-homogenizing element 118, the long sides of the light-input end X1 can correspond the long axis direction of the light spot BP. As a result, a better light receiving efficiency and a better utilization rate can be achieved.

Figure 9:
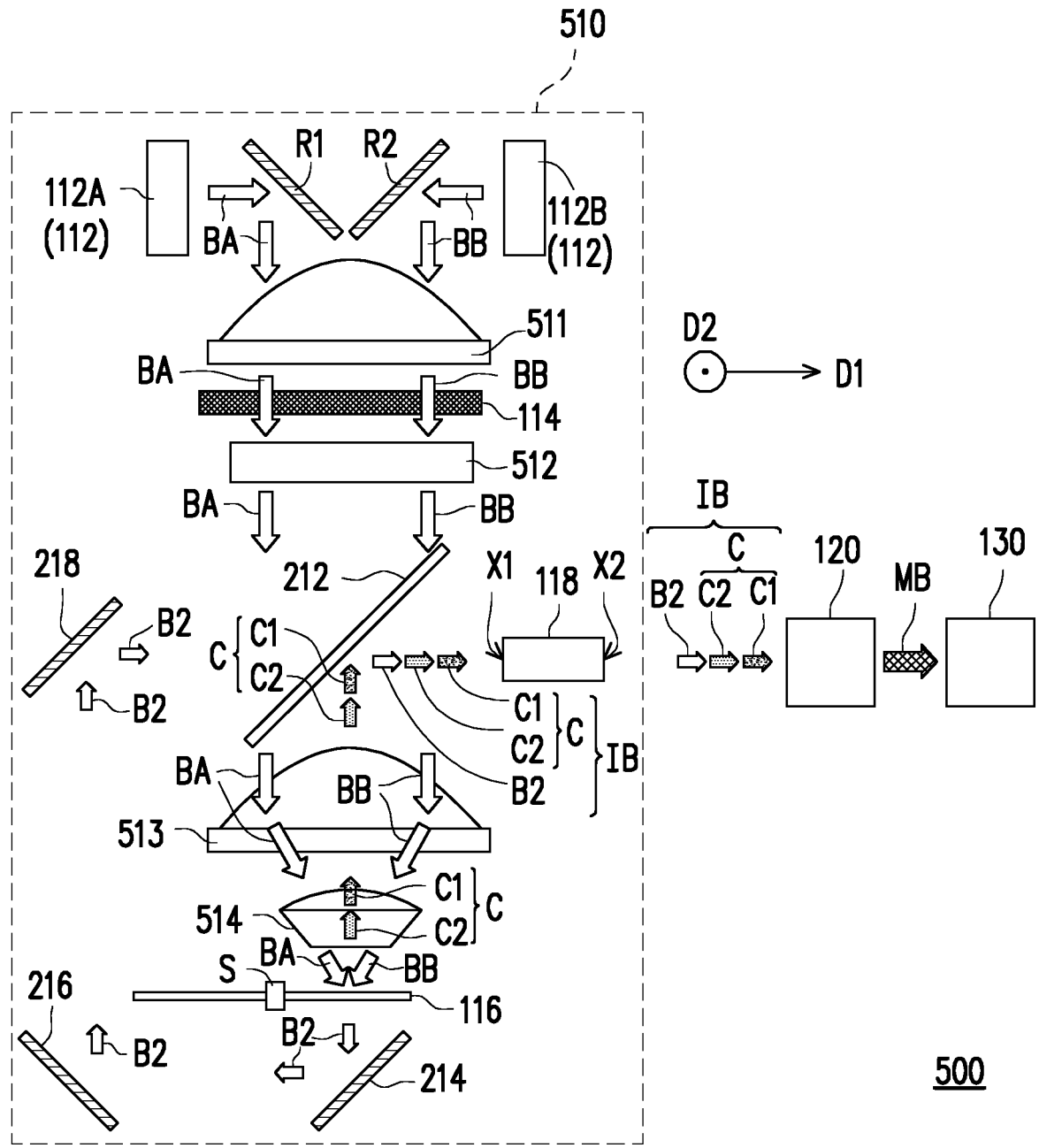
FIG. 9 is a schematic top view of a projection apparatus according to the fifth embodiment of the disclosure.

FIG. 9 is a schematic top view of a projection apparatus according to the fifth embodiment of the disclosure. Referring to FIG. 9, a projection apparatus 500 of the fifth embodiment of the disclosure is similar to the projection apparatus 300 of FIG. 5. The main differences between the two embodiments are described as follows. In the illumination system 510 of the projection apparatus 500, the light source 112 includes a plurality of first light-emitting elements 112A and a plurality of second light-emitting elements 112B (the plurality of first light-emitting elements 112A and the plurality of second light-emitting elements 112B are schematically depicted as two rectangles in FIG. 9). The plurality of first light-emitting elements 112A emit a plurality of first sub-beams BA (the plurality of first sub-beams BA are schematically depicted as arrows in FIG. 9). The plurality of second light-emitting elements 112B emit a plurality of second sub-beams BB (the plurality of second sub-beams BB are schematically depicted as arrows in FIG. 9).

Moreover, in addition to the light combiner 212, the reflecting element 214, the reflecting element 216, and the reflecting element 218, the illumination system 510 further includes a converging element 511 and a collimating element 512. The converging element 511 is disposed on the transmission paths of the plurality of first sub-beams BA and the plurality of second sub-beams BB. The collimating element 512 is disposed on the transmission paths of the plurality of first sub-beams BA and the plurality of second sub-beams BB from the converging element 511. The light combiner 212 is disposed on the transmission paths of the plurality of first sub-beams BA and the plurality of second sub-beams BB from the converging element 512. The wavelength conversion module 116 is disposed on the transmission paths of the plurality of first sub-beams BA and the plurality of second sub-beams BB from the light combiner 212.

Based on the above, the illumination system 510 may optionally include other elements. For example, the illumination system 510 may further include a reflecting element R1, a reflecting element R2, a lens element 513, and a lens element 514. The reflecting element R1 is disposed on the transmission paths of the plurality of first sub-beams BA from the plurality of first light-emitting elements 112A to reflect the plurality of first sub-beams BA from the plurality of first light-emitting elements 112A to the converging element 511. The reflecting element R2 is disposed on the transmission paths of the plurality of second sub-beams BB from the plurality of second light-emitting elements 112B to reflect the plurality of second sub-beams BB from the plurality of second light-emitting elements 112B to the converging element 511. The lens element 513 is disposed on the transmission paths of the plurality of first sub-beams BA and the plurality of second sub-beams BB from the converging element 212. The lens element 514 is disposed on the transmission paths of the plurality of first sub-beams BA and the plurality of second sub-beams BB from the lens element 513. The wavelength conversion module 116 is disposed on the transmission paths of the plurality of first sub-beams BA and the plurality of second sub-beams BB from the lens element 514. The plurality of first sub-beams BA and the plurality of second sub-beams BB from the light combiner 212 sequentially pass through the lens element 513 and the lens element 514 and then converge into the wavelength conversion module 116.

In the embodiment, the number of the light-diffusion element 114 is one, and the light-diffusion element 114 is disposed between the converging element 511 and the collimating element 512, but the disclosure is not limited thereto. In another embodiment, the light-diffusion element 114 is disposed between the plurality of first light-emitting elements 112A and the converging element 511 (for example, between the plurality of first light-emitting elements 112A and the reflecting element R1 or between the reflecting element R1 and the converging element 511), between the plurality of second light-emitting elements 112B and the converging element 511 (for example, between the plurality of second light-emitting elements 112B and the reflecting element R2 or between the reflecting element R2 and the converging element 511), or between the collimating element 512 and the light combiner 212.

In yet another embodiment, the illumination system 510 may include a plurality of light-diffusion elements, and the plurality of light-diffusion elements may be respectively disposed between the plurality of first light-emitting element 112A and the converging element 511, between the plurality of second light-emitting element 112B and the converging element 511, between the converging element 511 and the collimating element 512, or between the collimating element 512 and the light combiner 212. Moreover, the plurality of light-diffusion elements may be connected to each other or separated from each other.

Figure 11:
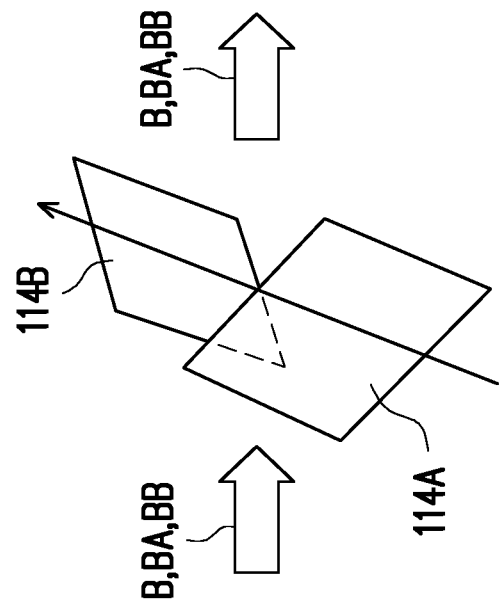
FIG. 10 and FIG. 11 are two views respectively illustrating two types of relative position of a plurality of light-diffusion elements.
Figure 10:
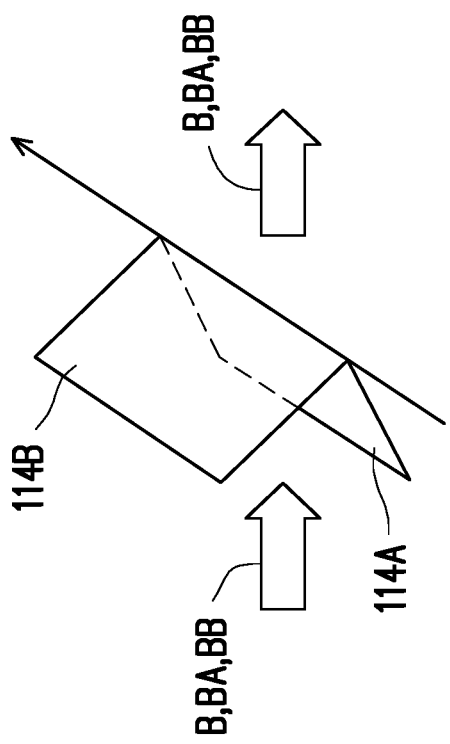

FIG. 10 and FIG. 11 are two views respectively illustrating two types of relative position of a plurality of light-diffusion elements, and FIG. 10 and FIG. 11 are used for representing the situation that the plurality of light-diffusion elements are connected to each other. However, the situation that the plurality of light-diffusion elements are connected to each other is not limited to the situations shown in FIG. 10 and FIG. 11. In addition, although FIG. 10 and FIG. 11 only show the relative position of two light-diffusion elements, the number of the plurality of light-diffusion elements in the illumination system may be more than two. In the situation that the plurality of light-diffusion elements are connected to each other, as shown in FIG. 10, a light-diffusion element 114A and a light-diffusion element 114B may be connected to each other at a single side. Alternatively, as shown in FIG. 11, the light-diffusion element 114A and the light-diffusion element 114B may be disposed to intersect with each other. The plurality of light-diffusion elements shown in FIG. 10 and FIG. 11 may be applied to (but not limited to) the embodiments in FIG. 1, FIG. 4, FIG. 5, and FIG. 9. When the plurality of light-diffusion elements are applied to the embodiment in FIG. 9, the plurality of light-diffusion elements may be respectively disposed at (but not limited to) one of the positions described in the FIG. 9, and the plurality of light-diffusion elements may be corresponding to one or a plurality of sub-beams (for example, corresponding to one or a plurality of first sub-beams BA, corresponding to one or a plurality of second sub-beams BB, corresponding to a combination of one or a plurality of first sub-beams BA and one or a plurality of second sub-beams BB). The plurality of sub-beams may be the plurality of first sub-beams BA (or the plurality of second sub-beams BB) from all of the first light-emitting elements 112A (or the second light-emitting elements 112B) or may be the plurality of first sub-beams BA (or the plurality of second sub-beams BB) from a part of the first light-emitting elements 112A (or the second light-emitting elements 112B).

In the situation that the plurality of light-diffusion elements are separated from each other, the plurality of light-diffusion elements are respectively disposed at one of the positions described in the FIG. 9, and each light-diffusion element is corresponding to one or a plurality of sub-beams. Alternatively, the plurality of light-diffusion elements are respectively disposed at two or more of the positions described in the FIG. 9, and each light-diffusion element is corresponding to one or a plurality of sub-beams.

Moreover, regardless of the situations that the plurality of light-diffusion elements are connected to each other or separated from each other, the inclined angles of the plurality of light-diffusion elements may be the same or different. In addition, when the plurality of light-diffusion elements are separated from each other, the rotating axes of the plurality of light-diffusion elements may be the same or different.

Figure 12:
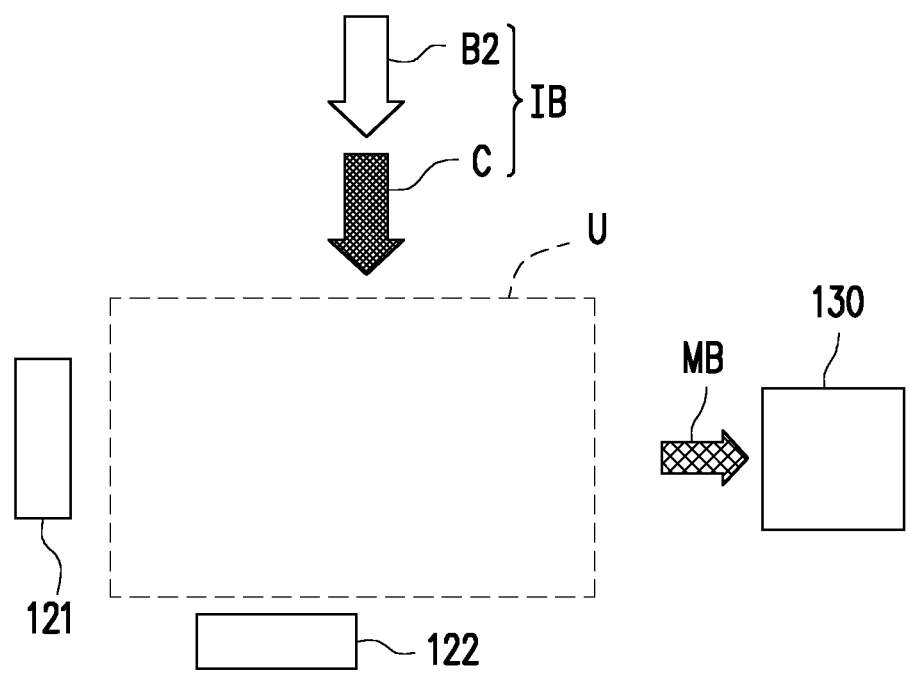
FIG. 12 and FIG. 13 are partial schematic views respectively illustrating a projection apparatus having two light valves and three light valves.
Figure 13:
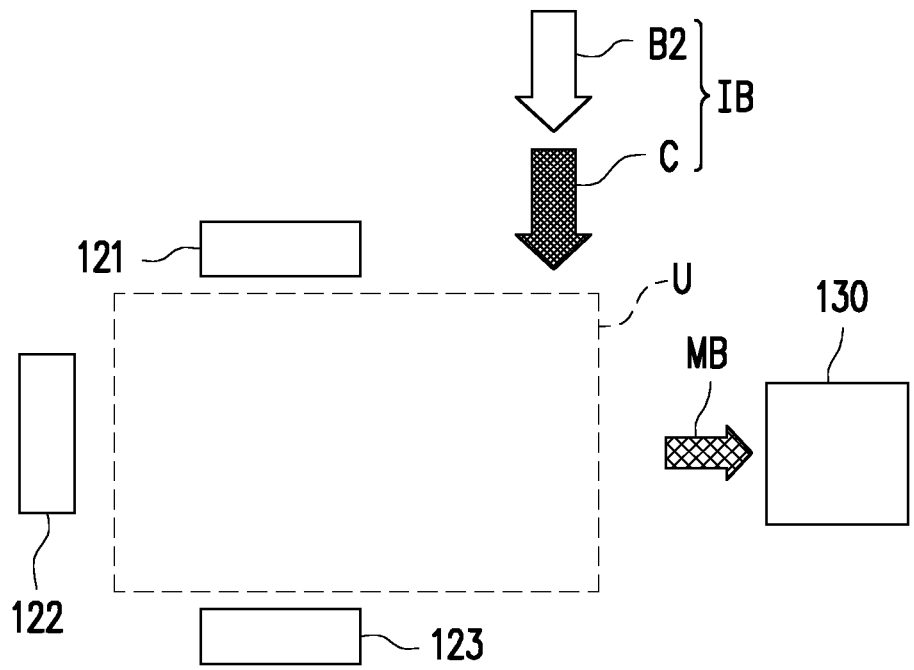

In the previous embodiments, the projection apparatus includes only one light valve, but the disclosure is not limited thereto. FIG. 12 and FIG. 13 are partial schematic views respectively illustrating a projection apparatus having two light valves and three light valves. Referring to FIG. 12, the projection apparatus may include a light valve 121, a light valve 122, and a light-splitting unit U. The light-splitting unit U is disposed on the transmission path of the illumination light beam IB, and the light-splitting unit U is adapted to guide the light beams having different colors in the illumination light beam IB to different light valves. The light valve 121 and the light valve 122 are disposed on the transmission paths of the illumination light beams IB from the light-splitting unit U, and the light valve 121 and the light valve 122 are adapted to covert the illumination light beams IB to the image light beams MB. The light-splitting unit U is further adapted to transmit the image light beams MB to the projection lens 130.

Referring to FIG. 13, in addition to the light valve 121, the light valve 122, and the light-splitting unit U shown in FIG. 12, the projection apparatus may further include a light valve 123. The light valve 121, the light valve 122, and the light valve 123 are disposed on the transmission paths of the illumination light beams IB from the light-splitting unit U, and the light valve 121, the light valve 122, and the light valve 123 are adapted to covert the illumination light beams IB to the image light beams MB. The light-splitting unit U is further adapted to transmit the image light beams MB to the projection lens 130.

Referring to FIG. 12 and FIG. 13, the light-splitting unit U may include a plurality of prisms. Moreover, the light-splitting unit U may also include a dichroic mirror or the dichroic layer(s) formed on the prisms. In one embodiment, when the dichroic mirror or the dichroic layer(s) is/are disposed, the filter element may be omitted in the illumination system.

Based on the above, the embodiments of the disclosure have at least one of the advantages or effects below. Since the at least one light-diffusion element is inclined to the transmission path of the light beam from the light source, the light spot projected on the wavelength conversion module is expanded along a single axial direction, and thus achieving the effect of reducing the energy density of the light beam. Therefore, the illumination system of the embodiments of the disclosure can effectively solve the problems that the wavelength conversion module is burned due to excessive concentration of beam energy illuminated on the wavelength conversion module, and that the light conversion efficiency is reduced. Moreover, the projection apparatus using the illumination system of the embodiments of the disclosure can have a good performance. In one embodiment, when the inclined angle of the at least one light-diffusion element is greater than or equal to 15 degrees and smaller than or equal to 60 degrees, the efficiency of the light beam passing through the at least one light-diffusion element can be maintained while the energy density is reduced. In another embodiment, the expensive light-diffusion element (such as a lens array) can be replaced by the less expensive light-diffusion element (such as a diffusion sheet) to reduce the cost and to reduce the influence of the assembly tolerance on the optical quality. In yet another embodiment, the illumination system may include a plurality of light-diffusion elements, and the size(s) and shape(s) of the light spot(s) projected on the wavelength conversion module can be adjusted by adjusting the inclined angles and the relative position of the plurality of light-diffusion elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
   an illumination system, comprising:
   a light source, adapted to emit a light beam;
   at least one light-diffusion element, disposed on a transmission path of the light beam from the light source, wherein the at least one light-diffusion element and a reference plane perpendicular to the transmission path of the light beam from the light source have an inclined angle therebetween, so that the at least one light-diffusion element is inclined to the transmission path of the light beam from the light source; and
   a wavelength conversion module, disposed on a transmission path of the light beam from the at least one light-diffusion element inclined, wherein a long axis direction of a light spot projected on the wavelength conversion module is perpendicular to an extending direction of a boundary between the reference plane and the at least one light-diffusion element, the wavelength conversion module comprises a light conversion area and a light un-conversion area, and is adapted to rotate, wherein when the light conversion area is rotated into a transmission path of the light beam, the light beam illuminating the light conversion area is a first portion of the light beam, and the first portion of the light beam from the at least one light-diffusion element is converted into a converted light beam, and when the light un-conversion area is rotated into the transmission path of the light beam, the light beam illuminating the light un-conversion area is a second portion of the light beam, and the converted light beam and the second portion of the light beam from the at least one light-diffusion element form an illumination light beam;
   at least one light valve, disposed on a transmission path of the illumination light beam and adapted to convert the illumination light beam to an image beam; and
   a projection lens, disposed on a transmission path of the image beam.

2. The projection apparatus as recited in claim 1, wherein the at least one light-diffusion element comprises a diffuser or a lens array.

3. The projection apparatus as recited in claim 1, wherein the illumination system further comprises:
   a light-homogenizing element, disposed on the transmission path of the illumination light beam, wherein a long axis direction of a light-output end of the light-homogenizing element is parallel to the long axis direction of the light spot.

4. The projection apparatus as recited in claim 1, wherein the illumination system further comprises:
   a light combiner, disposed on the transmission path of the light beam from the at least one light-diffusion element, wherein the wavelength conversion module is disposed on a transmission path of the light beam from the light combiner, and the wavelength conversion module is adapted to transmit the converted light beam to the light combiner and allow the second portion to pass through; and
   a plurality of reflecting elements, disposed on a transmission path of the second portion from the wavelength conversion module and adapted to transmit the second portion to the light combiner.

5. The projection apparatus as recited in claim 4, wherein the at least one light-diffusion element is disposed on a surface of the light combiner facing the light source, and the illumination system further comprises:
   a light-homogenizing element, disposed on the transmission path of the illumination light beam, wherein a long axis direction of a light-output end of the light-homogenizing element is perpendicular to the long axis direction of the light spot projected on the wavelength conversion module and the extending direction of the boundary.

6. The projection apparatus as recited in claim 1, wherein the light source comprises a plurality of first light-emitting elements and a plurality of second light-emitting elements, the plurality of first light-emitting elements emit a plurality of first sub-beams, the plurality of second light-emitting elements emit a plurality of second sub-beams, and the illumination system further comprises:
 a converging element, disposed on transmission paths of the plurality of first sub-beams and the plurality of second sub-beams;
 a collimating element, disposed on transmission paths of the plurality of first sub-beams and the plurality of second sub-beams from the converging element;
 a light combiner, disposed on transmission paths of the plurality of first sub-beams and the plurality of second sub-beams from the collimating element, wherein the wavelength conversion module is disposed on transmission paths of the plurality of first sub-beams and the plurality of second sub-beams from the light combiner, and the wavelength conversion module is adapted to transmit the converted light beam to the light combiner and allow the second portion to pass through; and
 a plurality of reflecting elements, disposed on a transmission path of the second portion from the wavelength conversion module and adapted to transmit the second portion to the light combiner, wherein the at least one light-diffusion element is disposed between the plurality of first light-emitting elements and the converging element, between the plurality of second light-emitting elements and the converging element, between the converging element and the collimating element, or between the collimating element and the light combiner.

7. The projection apparatus as recited in claim 6, wherein the number of the at least one light-diffusion element is plural, and the light-diffusion elements are respectively disposed between the plurality of first light-emitting elements and the converging element, between the plurality of second light-emitting elements and the converging element, between the converging element and the collimating element, or between the collimating element and the light combiner.

8. An illumination system, comprising:
 a light source, adapted to emit a light beam;
 at least one light-diffusion element, disposed on a transmission path of the light beam from the light source, wherein the at least one light-diffusion element and a reference plane perpendicular to the transmission path of the light beam from the light source have an inclined angle therebetween, so that the at least one light-diffusion element is inclined to the transmission path of the light beam from the light source; and
 a wavelength conversion module, disposed on a transmission path of the light beam from the at least one light-diffusion element inclined, wherein a long axis direction of a light spot projected on the wavelength conversion module is perpendicular to an extending direction of a boundary between the reference plane and the at least one light-diffusion element, the wavelength conversion module comprises a light conversion area and a light un-conversion area, and is adapted to rotate, wherein when the light conversion area is rotated into a transmission path of the light beam, the light beam illuminating the light conversion area is a first portion of the light beam, and the first portion of the light beam from the light-diffusion element is converted into a converted light beam, and when the light un-conversion area is rotated into the transmission path of the light beam, the light beam illuminating the light un-conversion area is a second portion of the light beam, and the converted light beam and the second portion of the light beam from the at least one light-diffusion element form an illumination light beam.

9. The illumination system as recited in claim 8, wherein the at least one light-diffusion element comprises a diffuser or a lens array.

10. The illumination system as recited in claim 8, further comprising:
 a light-homogenizing element, disposed on a transmission path of the illumination light beam, wherein a long axis direction of a light-output end of the light-homogenizing element is parallel to the long axis direction of the light spot.

11. The illumination system as recited in claim 8, further comprising:
 a light combiner, disposed on the transmission path of the light beam from the at least one light-diffusion element, wherein the wavelength conversion module is disposed on a transmission path of the light beam from the light combiner, and the wavelength conversion module is adapted to transmit the converted light beam to the light combiner and allow the second portion to pass through; and
 a plurality of reflecting elements, disposed on a transmission path of the second portion from the wavelength conversion module and adapted to transmit the second portion to the light combiner.

12. The illumination system as recited in claim 11, wherein the at least one light-diffusion element is disposed on a surface of the light combiner facing the light source, and the illumination system further comprises:
 a light-homogenizing element, disposed on the transmission path of the illumination light beam, wherein a long axis direction of a light-output end of the light-homogenizing element is perpendicular to the long axis direction of the light spot projected on the wavelength conversion module and the extending direction of the boundary.

13. The illumination system as recited in claim 8, wherein the light source comprises a plurality of first light-emitting elements and a plurality of second light emitting elements, the plurality of first light-emitting elements emit a plurality of first sub-beams, the plurality of second light-emitting elements emit a plurality of second sub-beams, and the illumination system further comprises:
 a converging element, disposed on transmission paths of the plurality of first sub-beams and the plurality of second sub-beams;
 a collimating element, disposed on transmission paths of the plurality of first sub-beams and the plurality of second sub-beams from the converging element;
 a light combiner, disposed on transmission paths of the plurality of first sub-beams and the plurality of second sub-beams from the collimating element, wherein the wavelength conversion module is disposed on transmission paths of the plurality of first sub-beams and the plurality of second sub-beams from the light combiner, and the wavelength conversion module is adapted to transmit the converted light beam to the light combiner and allow the second portion to pass through; and
 a plurality of reflecting elements, disposed on a transmission path of the second portion from the wavelength conversion module and adapted to transmit the second portion to the light combiner, wherein the at least one light-diffusion element is disposed between the plurality of first light-emitting elements and the converging element, between the plurality of second light-emitting elements and the converging element, between the converging element and the collimating element, or between the collimating element and the light combiner.

14. The illumination system as recited in claim 13, wherein the number of the at least one light-diffusion element is plural, and the light-diffusion elements are respectively disposed between the plurality of first light-emitting elements and the converging element, between the plurality of second light-emitting elements and the converging element, between the converging element and the collimating element, or between the collimating element and the light combiner.

\* \* \* \* \*